United States Patent [19]

Boolchand et al.

[11] Patent Number: 5,327,733
[45] Date of Patent: Jul. 12, 1994

[54] SUBSTANTIALLY VIBRATION-FREE SHROUD AND MOUNTING SYSTEM FOR SAMPLE COOLING AND LOW TEMPERATURE SPECTROSCOPY

[75] Inventors: Punit Boolchand; George H. Lemon, both of Cincinnati, Ohio; Wayne J. Bresser, Park Hills; Raymond N. Enzweiler, Fort Thomas, both of Ky.; Richard L. Harris, Cincinnati, Ohio

[73] Assignee: University of Cincinnati, Cincinnati, Ohio

[21] Appl. No.: 27,408

[22] Filed: Mar. 8, 1993

[51] Int. Cl.[5] .............................................. F25B 19/00
[52] U.S. Cl. ...................................... 62/51.1; 62/295; 62/297; 248/636; 248/638
[58] Field of Search ....................... 62/51.1, 295, 297; 248/636, 638

[56] References Cited

U.S. PATENT DOCUMENTS

| | | | |
|---|---|---|---|
| 3,620,029 | 11/1971 | Longsworth | 62/6 |
| 3,894,403 | 7/1975 | Longsworth | 62/51.1 |
| 4,161,747 | 7/1979 | Jennings | 357/82 |
| 4,363,217 | 12/1982 | Venuti | 62/55.5 |
| 4,394,819 | 7/1983 | Averili | 62/295 |
| 4,498,046 | 2/1985 | Faris et al. | 62/51.1 |
| 4,833,899 | 5/1989 | Tugal | 62/55.5 |
| 4,835,972 | 6/1989 | Tugal et al. | 62/50.1 |
| 4,854,131 | 8/1989 | Sakitani et al. | 62/51.2 |
| 4,862,697 | 8/1989 | Tugal et al. | 62/55.5 |
| 4,891,955 | 1/1990 | Klausing et al. | 62/297 |
| 4,926,647 | 5/1990 | Dorri et al. | 62/51.1 |
| 4,930,318 | 6/1990 | Brzozowski | 62/295 |
| 5,018,359 | 5/1991 | Horikawa et al. | 62/297 |
| 5,056,319 | 10/1991 | Strasser | 62/295 |
| 5,129,232 | 7/1992 | Minas et al. | 62/297 |

OTHER PUBLICATIONS

*The Use of a Helium Refrigerator for Mossbauer Studies,* Nuclear Instruments and Methods 66 (1968), North Holland Publishing Co., pp. 177-180.
*Motional Broadening of $^{57}Fe$ Mossbauer-Effect Resonance in Cuprate Superconducts,* Physical Review Letters, vol. 67, No. 22, 25 Nov., 1991, pp. 3184-3187.

Primary Examiner—Ronald C. Capossela
Attorney, Agent, or Firm—Frost & Jacobs

[57] ABSTRACT

An improved vibration-free mounting system for sample cooling and low temperature and precision spectroscopy in which a closed-cycle helium refrigerator mechanism is to be mounted adjacent to a cold test chamber to enable efficient sample cooling. The system includes a first rigid support structure which receives and supports the refrigerator mechanism, and a second rigid support structure independently receiving and supporting a shroud having a cold test chamber for housing test samples on a sample holder. The second support structure is physically isolated from the first structure to prevent the transfer of vibrations therebetween, and the first and second structures are rigidly aligned with one another along a vertical axis. A gas envelope vibration isolating connection is provided between the refrigerator mechanism and the shroud for providing thermal communication for efficient sample cooling. The second support structure is preferably mounted on a vibration isolation table having a plate-like top supported by a volume of relatively loosely packed and dry granular material such as sand. The shroud also preferably includes a flange for enabling rigid mounting of the spectrometer device adjacent the test chamber. The shroud can also comprise a removable lower section to facilitate access to the sample holder and various experimental setups.

22 Claims, 7 Drawing Sheets

SUBSTANTIALLY VIBRATION-FREE SHROUD AND MOUNTING SYSTEM FOR SAMPLE COOLING AND LOW TEMPERATURE SPECTROSCOPY

TECHNICAL FIELD

This invention relates to an improved mounting system for low temperature sample cooling and spectroscopy arrangements which include a refrigeration device and a sample holder, and, more particularly, to a shroud and mounting system combination particularly useful in low temperature sample cooling and spectroscopy studies utilizing a closed-cycle helium refrigerator and requiring a substantially vibration-free arrangement of the cooled sample holder and testing equipment.

BACKGROUND ART

There are a variety of analytical testing procedures and experiments which must be undertaken in low temperature environments, typically in the temperature range of between about 3 degrees Kelvin to about 200 degrees Kelvin (3° K to about 200° K). Conventional sample cooling and testing apparatus designs utilize liquid nitrogen, liquid helium, or both to obtain the required low temperatures. Implementation and application of these mildly hazardous materials is generally costly, labor intensive, and inconvenient as a result of the relatively high cost of the materials themselves, the frequent transfers from storage containers to experimental apparatus, and the equipment necessary to confine and handle such materials safely and efficiently. Analyses and experiments requiring substantial time periods at reduced temperatures also pose significant hurdles in maintaining the experimental setups at the necessary low temperatures.

Recently, however, advancements in technology have enabled the use of closed-cycle helium refrigerators in place of the low temperature liquids, as, for example, described in the article entitled *The Use of a Helium Refrigerator for Mossbauer Studies*, by Y. Chow, et al. (Vol. 66, Nuclear Instruments and Methods, 1968). As mentioned by Chow et al., in order to obtain appreciable Mossbauer effect, it is often necessary for the gamma-ray emitter and/or absorber (sample) to be cooled to cryogenic temperatures. While the helium refrigerator has been found to be an efficient and cost effective alternative to the use of expensive cryogens, practical applications of these devices are plagued by vibrations from the refrigerator itself, including vibrations associated with compression/decompression of the helium gas, as well as the motion of pistons in their cylinders. The result of these mechanical vibrations has severely limited the application and usefulness of these helium refrigerator devices in the more vibration-sensitive techniques such as Mossbauer spectroscopy and the like.

A number of approaches directed to obtaining relatively vibration-free sample cooling have been attempted in the industry. Examples include: attachment of the sample holder to the refrigerator cooling mechanism through flexible copper braids to provide a non-rigid thermal conduction path, as seen in U.S. Pat. No. 4,854,131 (Sakitani et al.); attaching a gas-filled envelope through a flexible bellows-like device for both thermal conduction and mechanical vibration isolation, as shown in U.S. Pat. No. 3,894,403; and providing gas by-pass arrangements to reduce inlet and outlet pressure differentials. While all of these approaches have been successful to some degree, none have provided a complete solution to the problem of isolating refrigerator vibrations in applications for sample cooling. For example, for the copper braid-type arrangement to provide an effective thermal conduction path, it must possess a sufficiently large cross-section, which inherently results in a compromise of the vibration isolation benefit, as some vibrations are always transmitted through the flexible braids. Some experiments have been conducted by turning the refrigerator compressor off while acquiring data. Long term low temperature maintenance is clearly a problem in such cases. Similarly, the use of by-pass lines and the like reduces, but does not eliminate, the vibrations which are inherent in these refrigerators. Moreover, by-passing arrangements do not eliminate the mechanical vibrations associated with the moving pistons of the refrigerator expander.

Taking a closer look at the vibration-free refrigeration transfer device of U.S. Pat. No. 3,894,403, there is described a mechanical device which decouples vibrations of the refrigerator from the sample by utilizing a helium exchange gas provided in an envelope that surrounds the refrigerator itself. While this gas envelope provides a larger area for thermal conduction and effectively isolates the mechanical vibrations, the arrangement shown and described in this patent fails to adequately address the arrangement for mounting the refrigeration system relative to the measurement system. The '403 patent merely suggests that a rigid support system be provided in order to derive the maximum benefit from the vibration isolation aspects of the invention, proposing a rail-like structure for rigidly attaching transducers and the gamma ray optics used in Mossbauer spectroscopy to a tabletop. No structure for vibration isolation or damping to prevent transmission of vibrations from the surrounding environment to the experimental equipment is disclosed in this patent document, and there is no true isolation provided between the refrigerator expander unit and the sample mounting structure. As a result, even the improved refrigeration transfer arrangement of this patent could not provide the essentially vibration-free system required for reliable use in conjunction with Mossbauer and other vibration-sensitive studies.

Moreover, a number of attempts have been made to provide adequate mounting of closed-cycle refrigerators for the purpose of eliminating vibration. None have been thoroughly described in the literature as successfully utilizing the refrigeration transfer arrangement described in the '403 patent.

U.S. Pat. No. 4,161,747, entitled SHOCK ISOLATOR FOR OPERATING A DIODE LASER ON A CLOSED CYCLE REFRIGERATOR, describes a mount which is rigidly affixed to a bench or table and upon which the laser diode is mounted. The vacuum shroud is attached to the bench, and the expander portion of the refrigerator is attached to the laser diode mount through a plurality of thermally conductive, flexible straps. The vibrations of the expander unit are isolated from the bench and mount assembly by connecting the vacuum shroud and its radiation shield to the expander by means of flexible vacuum hoses. While this mounting system is relatively compact, this arrangement suffers critical residual vibrations with amplitudes of nearly 2300 nm or more because the conductive straps provide a path through which vibration can be transmitted to the laser diode mount, and because the vacuum hoses are incapable of totally absorbing shock and vibration along their central axis. As a result, vibration is transmitted to the vacuum shroud, the bench and the diode mount.

U.S. Pat. No. 4,384,819, entitled VIBRATION ISOLATION AND PRESSURE COMPENSATION APPARATUS FOR SENSITIVE INSTRUMENTATION, describes a mounting arrangement for closed-cycle refrigerator which allegedly isolates the refrigerators from vibration-sensitive instruments while permitting thermal contact therebetween. The patent describes the combination of flexible, thermally conductive straps to couple the sensitive instruments to the cold end of the refrigerator, a housing assembly to be secured to an instrument platform, a reaction bracket supporting the refrigerator expander unit and absorbing shock and vibration therefrom, a cryocooler, and a flexible bellows arrangement to physically attach the cryocooler to the instrument chamber and reaction bracket. As set forth in this patent, however, the resulting line width broadening of $CCl_2$ is increased by 2 MHz, or about 5.4%. An equivalent line broadening measured by Mossbauer spectroscopy would yield a residual vibration amplitude of nearly a full micron of motion.

Moreover, the apparatus of the '819 patent is contemplated for specialized applications such as airborne instrumentation and the like, and is relatively limited in applications outside of that field. In any case, while this system appears to provide some improvement in accuracy of experimental results, the residual vibration levels of the system continue to remain above acceptable levels for applications such as Mossbauer spectroscopy.

The very low temperature refrigerator shown and described in U.S. Pat. No. 4,854,131 includes a mounting system for rigidly suspending the refrigerator in a cryostat, while providing for vibration isolation therebetween. This structural setup resembles the refrigeration transfer interface of U.S. Pat. No. 3,894,403 described above, but employs a suspension system comprising an array of wires which are connected tangentially at various points along the cold end of the refrigerator. The cold end of the refrigerator, is, in turn, connected to the sample by way of a flexible, thermally conductive strap. While this mounting arrangement provides a relatively compact structure, the residual vibration amplitude at low frequency is nearly 1000 nm, and is substantially above acceptable levels for some of the more vibration-sensitive procedures.

U.S. Pat. Nos. 4,363,217; 4,833,899; 4,835,972; and 4,862,697 pertain to structures contemplated for vibration damping and isolation of cryopumps. In particular, these patents illustrate the suspension of the refrigerator expander head having a weight attached to dampen vibratory motions; and, alternatively, hanging the refrigerator expander head from a self-supporting bellows configuration. While the weight of the first arrangement does not tend to move precisely out of phase with the refrigerator, the vibratory amplitude is significantly damped to permit proper operation of some vibration-sensitive equipment, such as electron microscopes. While such active vibration damping arrangements have some meaningful usage with respect to cryopumps and relatively less sensitive equipment and procedures, they do not provide the high level of vibration isolation required for sample cooling and low temperature experiments which nominally require freedom from vibration.

Consequently, the structures and methods heretofore available for mounting of closed-cycle helium refrigerators for sample cooling and low temperature spectroscopy have failed to provide the required substantially vibration-free environments necessary for optimum performance and resolution. In this regard, there has not been available an adequate solution to the problem of refrigerator vibrations in applications for sample cooling, as residual vibration amplitudes persist above acceptable levels. Similarly, there has not been available a mounting system which provides true isolation between the refrigerator expander unit and the sample mount, and vibrations present in the ambient environment due to the operation of the refrigerator compressor have not been prevented from being transmitted directly to the experimental apparatus. Available methods simply did not hold the sample mount stationary relative to measurement devices while simultaneously providing for the low temperatures and flexibility for adaptations required to undertake a variety of sample cooling and spectroscopy operations.

DISCLOSURE OF THE INVENTION

It is an object of this invention to obviate the above-described problems and shortcomings of the mounting systems for closed-cycle helium refrigerators used in conjunction with sample cooling and low temperature spectroscopy.

It is another object of the present invention to provide a flexible shroud arrangement and substantially vibration-free mounting system for sample cooling and low temperature spectroscopy.

It is yet another object of the present invention to provide an improved mounting system for closed-cycle refrigeration systems which features separate mounting of the refrigerator expander unit from the sample holder/cooling chamber to provide for substantially vibration-free sample cooling and enhanced low temperature spectroscopy.

It is also an object of the present invention to provide a substantially vibration-free mounting system for sample cooling, wherein no active vibration damping is required and the refrigerator expander and sample holder are held rigidly in place but physically isolated from one another.

It is yet another object of the present invention to provide an improved substantially vibration-free mounting system for sample cooling and low temperature spectroscopy, wherein there is provided true vibration isolation and damping throughout the mounting arrangement.

It is another object of the present invention to provide a substantially vibration-free mounting system which is relatively simple in design and easily adaptable to a variety of refrigerator installation environments and sample cooling arrangements.

In accordance with one aspect of the present invention, there is provided an improved vibration-free mounting system for sample cooling and low temperature precision spectroscopy in which a closed-cycle helium refrigerator mechanism is to be mounted adjacent to a cold test chamber to enable efficient and continuous sample cooling. The system includes a first rigid support structure which receives and supports the refrigerator mechanism, and a second rigid support structure independently receiving and supporting a shroud having a cold test chamber for housing test samples on a sample holder. The test samples are to be cooled to extremely low temperatures by the refrigerator mechanism. A second support structure is physically isolated from the first structure to prevent the transfer of vibrations therebetween, and the first and second structures are aligned with one another along a vertical axis. A gas envelope vibration isolating connection is provided between the refrigerator mechanism and the shroud for providing thermal communication for efficient sample cooling. The second support structure is preferably mounted on a vibration isolation table having a plate-like top supported by a volume of relatively loosely packed and dry granular material. The shroud also preferably includes a flange for enabling rigid mounting of the spectrometer device adjacent the test chamber.

In a preferred arrangement, the shroud further includes an upper portion and a removable lower portion which defines at least a portion of the test chamber. This lower portion can be selectively removed to enable substantially unencumbered access to the sample holder, and to enable interchange of modular lower shroud portions for quick adaption to varying experimental procedures. Alternatively, the shroud can include a door-like structure having an open position for selectively providing relatively unencumbered access to the sample holder.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 1b is a partial perspective view of the lower section of the mounting system of FIG. 1a;

DETAILED DESCRIPTION OF THE INVENTION

Figure 1A:
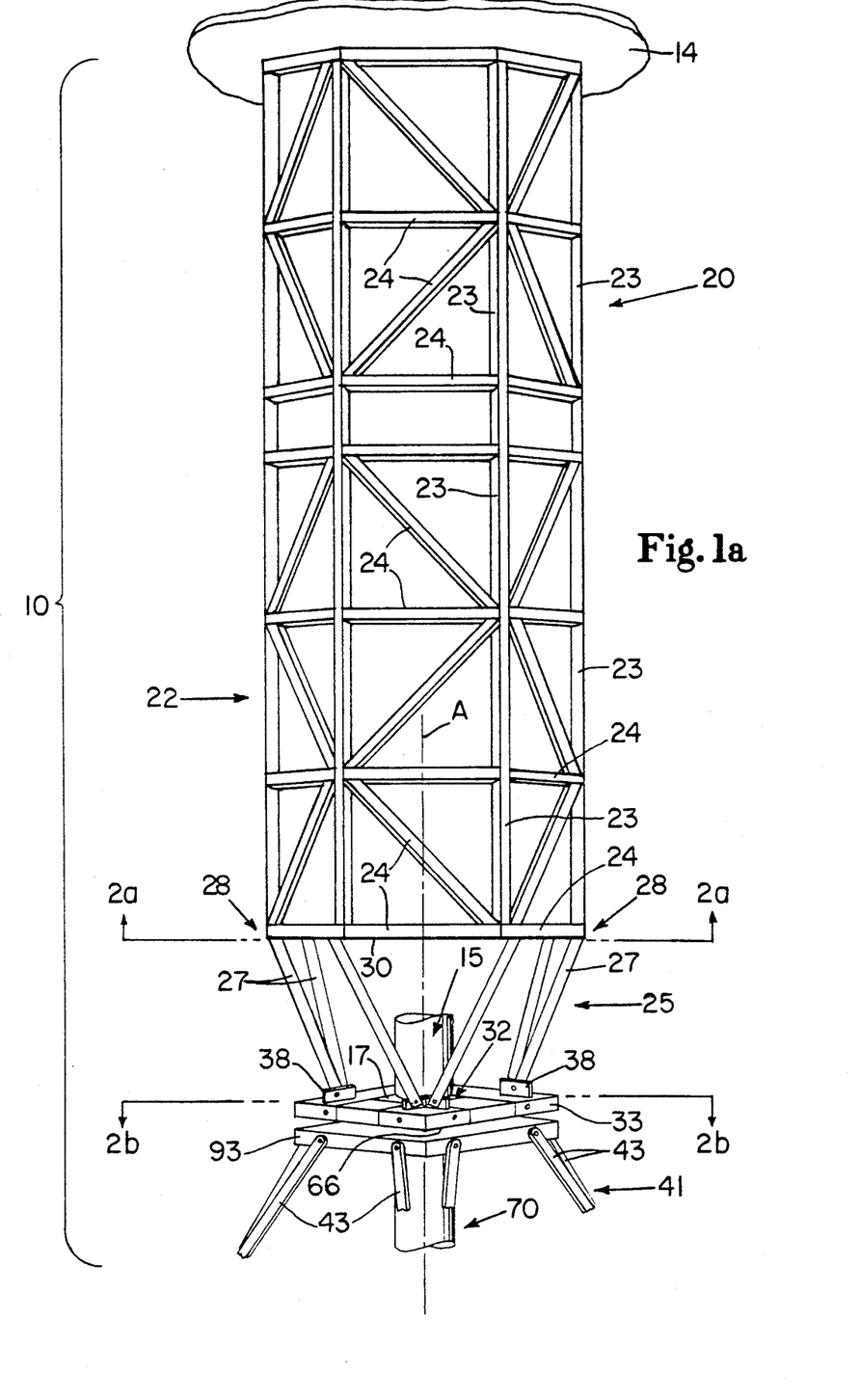
FIG. 1a is a partially broken-out, partial perspective view of a preferred embodiment of the substantially vibration-free mounting system of the present invention, illustrating the front portions of an octagonal upper frame.
Figure 1B:
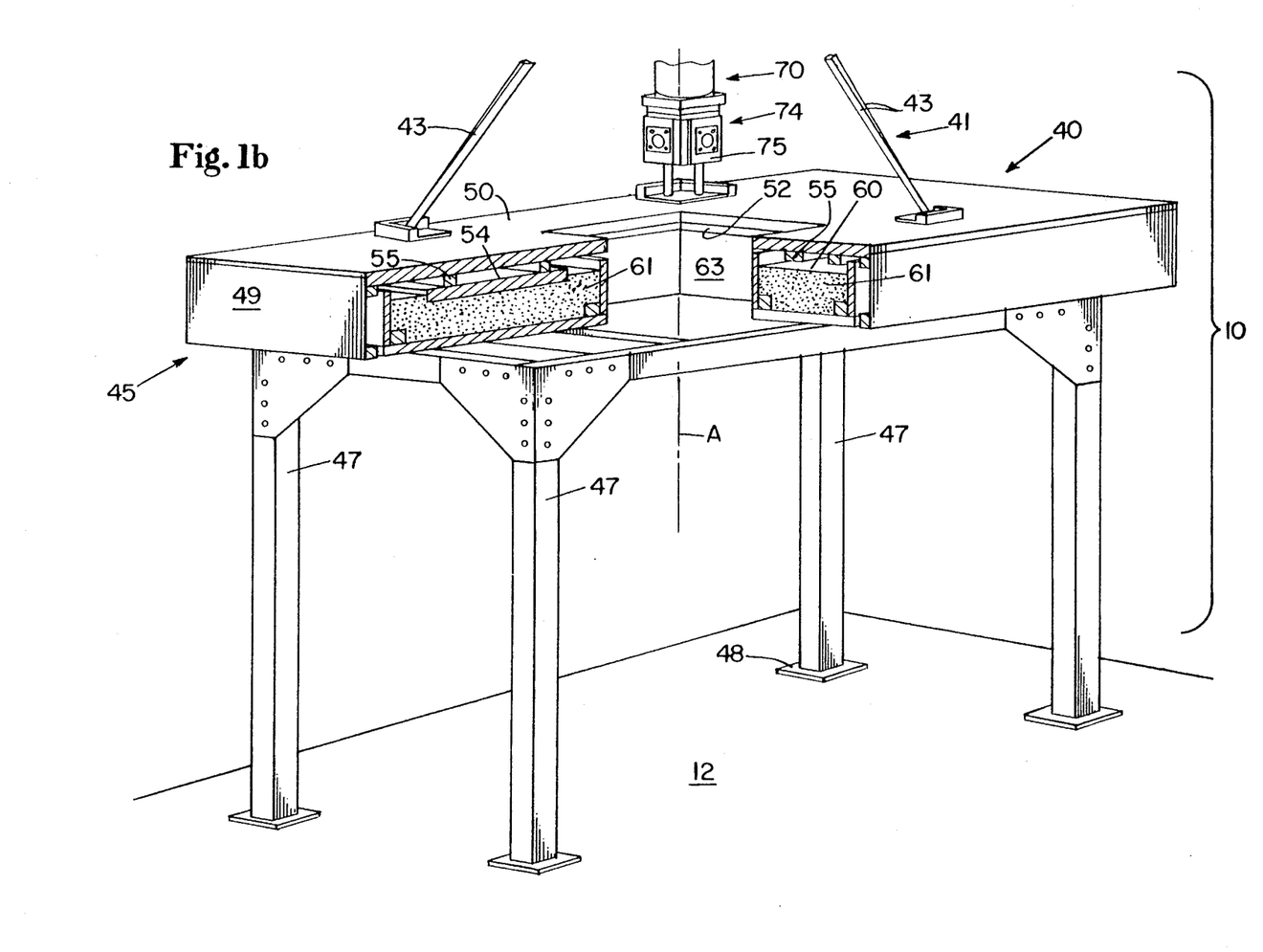

Referring now to the drawings in detail, wherein like numerals indicate the same elements throughout the views, FIGS. 1a and 1b illustrate an improved, substantially vibration-free mounting system 10 made in accordance with the present invention. Mounting system 10 is shown for illustrative purposes as being mounted between the floor 12 and ceiling 14 of a laboratory or similar structure. Particularly, a first rigid support structure or tower 20 is illustrated as being attached at its upper end to ceiling 14. It should be understood, however, that the present mounting system can be equally installed and utilized in situations where the ceiling is unavailable or not preferred for supporting first structure 20. For example, structure 20 might be cantilevered from a support wall, or independently supported from floor 12, such as by upwardly extending columns or the like (not shown).

Figure 2A:
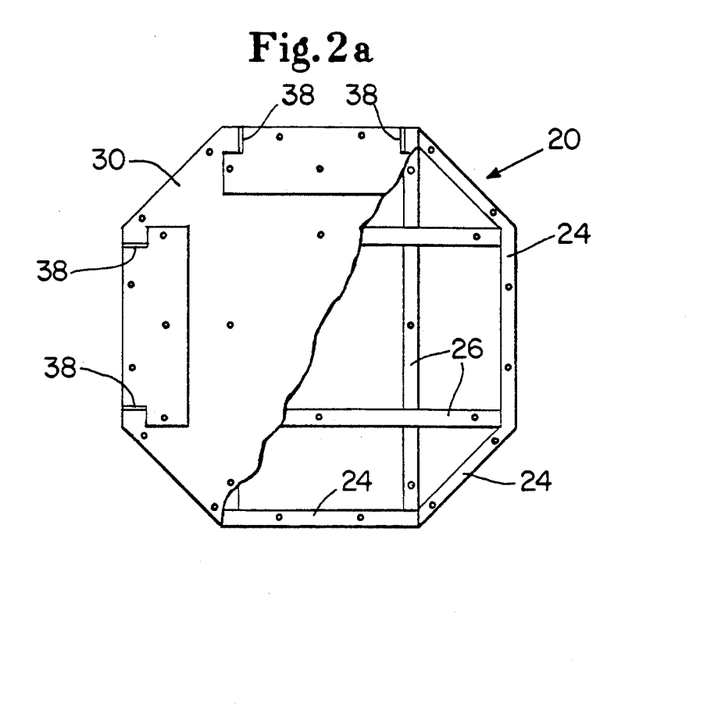
FIG. 2a is a partially broken out plan view of the reaction plate member of the upper frame of FIG. 1a, taken along viewing line 2a-2a thereof, and shown without the expander unit and its flange.

First rigid support structure 20 is illustrated as preferably comprising an upper frame 22 which forms a rigid framework including a plurality of upright strut members 23 connected in any convenient manner, such as by welding, bolting, or the like, to cross braces 24. While it is preferred that a plurality of substantially vertical support struts 23 will be rigidly supported in a triangulated manner by a plurality of cross braces 24 to optimize rigidity and efficient transfer of both lateral and rotational forces, other rigid mounting arrangements can be equally utilized. Upper frame 22 further preferably comprises a reaction plate member 30 backed by cross members 26 attached to the lower portions of strut members 23 and their lower associated cross braces 24. Member 30 may be provided in a plate-like polygonal form as illustrated, and augments the rigidity to the structure. As best seen in FIG. 2a, a preferred support structure 20 will have a generally octagonal overall configuration. This polygonal configuration can, of course, be modified as appropriate for particular applications.

As best seen in FIG. 1a, a lower frame member 25 is illustrated as depending downwardly from adjacent the lower portions of upper frame 22 and its plate member 30. Lower frame 25 preferably similarly comprises a plurality of triangulated strut members 27, which can be rigidly attached to upper frame 27, such as by the flange (e.g., 38) and bolt (e.g., 28) arrangements illustrated. As will be appreciated, first rigid support structure 20 is to rigidly and independently support the refrigerator mechanism 15, which can comprise the expander portion of a closed-cycle helium refrigerator such as shown and described in U.S. Pat. No. 3,894,403, the description of which being hereby incorporated herein by reference. As helium closed-cycle refrigerators are available in the industry from various manufacturers such as CTI Cryogenics, CVI, APD Cryogenics, and CryoMech, further details of the refrigerator mechanism itself will be limited herein to illustration and/or description of important interface relationships with the present mounting system.

Figure 2B:
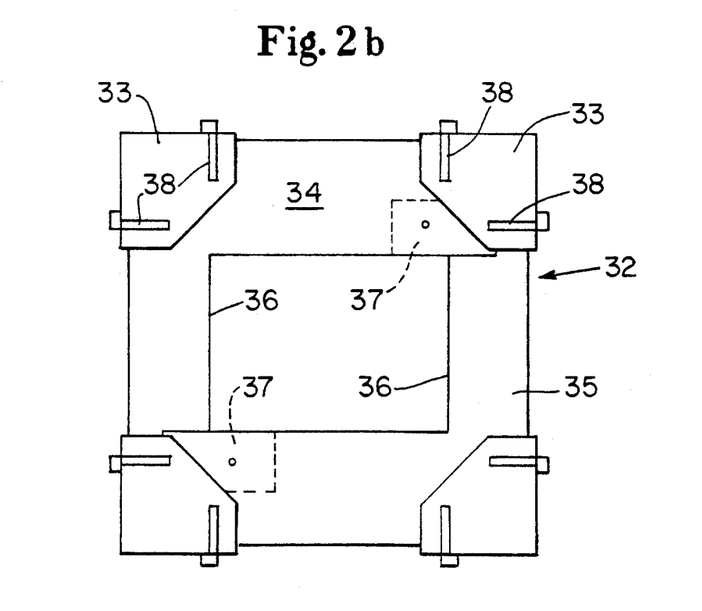
FIG. 2b is a partial plan view of a preferred mounting platform provided on the upper frame of FIG. 1a, taken along viewing line 2b-2b thereof.

As best seen in FIGS. 1a and 2b, adjacent to the lower portion of lower frame 25, there is provided a mounting platform 32 for receiving and rigidly supporting refrigerator mechanism 15. Platform 32 preferably comprises additional support frame elements 29 adapted to rigidly receive an outwardly extending flange commonly associated with the expander portions of refrigerator mechanisms available in the industry. As seen best in FIG. 2b, it is also preferred that mounting platform 32 comprise a plurality of support clips 33 attached via extended flanges 38 to the lower distal ends of strut members 27 for removably receiving the outer edges of interchangeable mounting plate adapters. Particularly, mounting plate adapters 34 and 35 comprise substantially Loshaped pieces designed to fit together to form a clamp periphery 36 corresponding with and rigidly receiving and securing the outer periphery of the flange (e.g., 17) of a refrigerator expander unit (e.g., 15).

Because the location and size of various refrigerator expander units and their flanges can vary among manufacturer's models, it is contemplated that mounting plate adapters of varying predetermined sizes can be provided with the present mounting system to enable convenient exchange as needed with different refrigerator mechanisms 15. Anchor clips 37 are provided to maintain mounting plate adapters 34 and 35 in rigid, connected position about the outer periphery of a refrigerator mechanism 15. In this way, it will be understood that the refrigerator mechanism 15 will be supported by rigid tower 20 in a substantially in flexible arrangement.

As best seen in FIG. 1b, a second rigid support structure 40 is provided for independently receiving and supporting the shroud 70, which comprises the sample cooling and test chamber 75, further described below. As will be understood, the cold test chamber 75 is designed to house test samples on a sample holder 77 at extremely low temperatures induced by refrigerator mechanism 15. As will be understood, shroud 70 must be held rigidly in place and in substantial vertical alignment along axis A with refrigerator mechanism 15, but must be physically isolated and independent of first rigid support structure 20 and its supported refrigerator mechanism 15. The vibrations from the refrigerator expander unit are conducted away from tower 20 to its support (e.g., building ceiling 14), and such vibrations must not be allowed to be transmitted to shroud 70.

Second rigid support structure 40 is illustrated as preferably comprising a somewhat skeletal, rigid pedestal member 41 having a plurality of pedestal struts 43 rigidly arranged in a triangular arrangement for strength. Pedestal 41 is, in turn, preferably mounted on a vibration damping table 45 having a table top 50, a table frame 49, and a plurality of support legs 47. As illustrated, it is contemplated that table 45 will most preferably be situated for support on a laboratory floor 12 or the like. It may also be preferred that vibration damping pads 48 be located between legs 47 and support surface 12, such as in the form of rubber wafers or similar damping media with sufficient load bearing capacity. Again, it is critical that second rigid support structure 40 be held in place to maintain the rigid alignment of shroud 70 with refrigerator mechanism 15 along axis A, and to provide vibration isolation and damping characteristics to obviate the transmission of any vibrations from the ambient environment (e.g., floor 12, ceiling 14, and/or walls) to the sample held within cold testing chamber 75.

In order to augment the vibration isolation characteristics of second rigid support structure 40, it is preferred that table frame 49 comprise a hollow recess 60 therewithin for receiving a volume of vibration damping and support material 61, as best seen in the broken out portion of FIG. 1. Particularly, relatively loosely packed and dry sand has been found to be an effective vibration damping medium for use in table 45. Vibration is not efficiently transferred between adjacent grains and the randomly oriented boundary of the loosely packed medium, thereby minimizing the mechanical link between table top 50 and the lower portions of second support structure 40. In contrast, air or hydraulic cushioning devices often found in modern optical laboratory setups, have been found to be unsuitable for effectively preventing transmission of ambient vibrations to the test chamber, as they would allow the effective movement of table top 50 and defeat the vibration isolation characteristics of the present invention.

As best seen in FIG. 1b, table top 50 preferably further comprises an access or maintenance opening 52 aligned with a corresponding axis opening cylinder or barrier 63 within table frame 49. The resulting hole or maintenance pit provided by opening 52 and its aligned cylinder 63 enables easy access to shroud 70 from below, can facilitate the removal of parts for maintenance of shroud 70 and the related sample holder and testing portions of the device, and permits placement of measurement devices immediately beneath the sample chamber to facilitate experimental measurements along the vertical axis perpendicular to the more frequently used horizontal axis. An access cover plate (not shown) might be provided for effectively closing the maintenance opening 52 when access to the lower portions of shroud 70 is not necessary.

Because table top 50 will be essentially "floating" on the granular vibration damping media 61 in a preferred arrangement, it is also desirable to provide additional means for anchoring plate 50 against relative movement in order to maintain proper rigid alignment of the testing equipment. As illustrated in FIG. 1b one or more anchor masses 54 can be attached to the lower surface of table top 50, such as via a plurality of connector members or standoffs 55. Anchor masses 54 might comprise concrete or granite plates or other similar rigid and substantially massive materials. As can be appreciated, table 45 and its associated parts will make up an assembly with relatively significant weight, due to the relative mass and the requirement that shroud 70 be maintained in precise alignment with refrigeration mechanism 15. It will also be understood that the provision of the access/maintenance opening 52 will minimize the need for movement and/or disassembly of mounting system 10 in use.

A thermal connection 66 comprising a vibration isolating sleeve, such as shown and described in U.S. Pat. No. 3,894,403, provides a non-mechanical connection between refrigerator mechanism 15 and shroud 70 between mounting platform 32 and attachment plate 93 at the upper end of rigid pedestal 41. As described above with respect to mounting platform 32, it is contemplated that attachment plate 93 might also preferably comprise a plurality of interconnecting and interchangeable mounting plate adapters (similar to adapters 34 and 35) in order to facilitate accommodation of shrouds and shroud flanges of varying sizes and structure.

Figure 3:
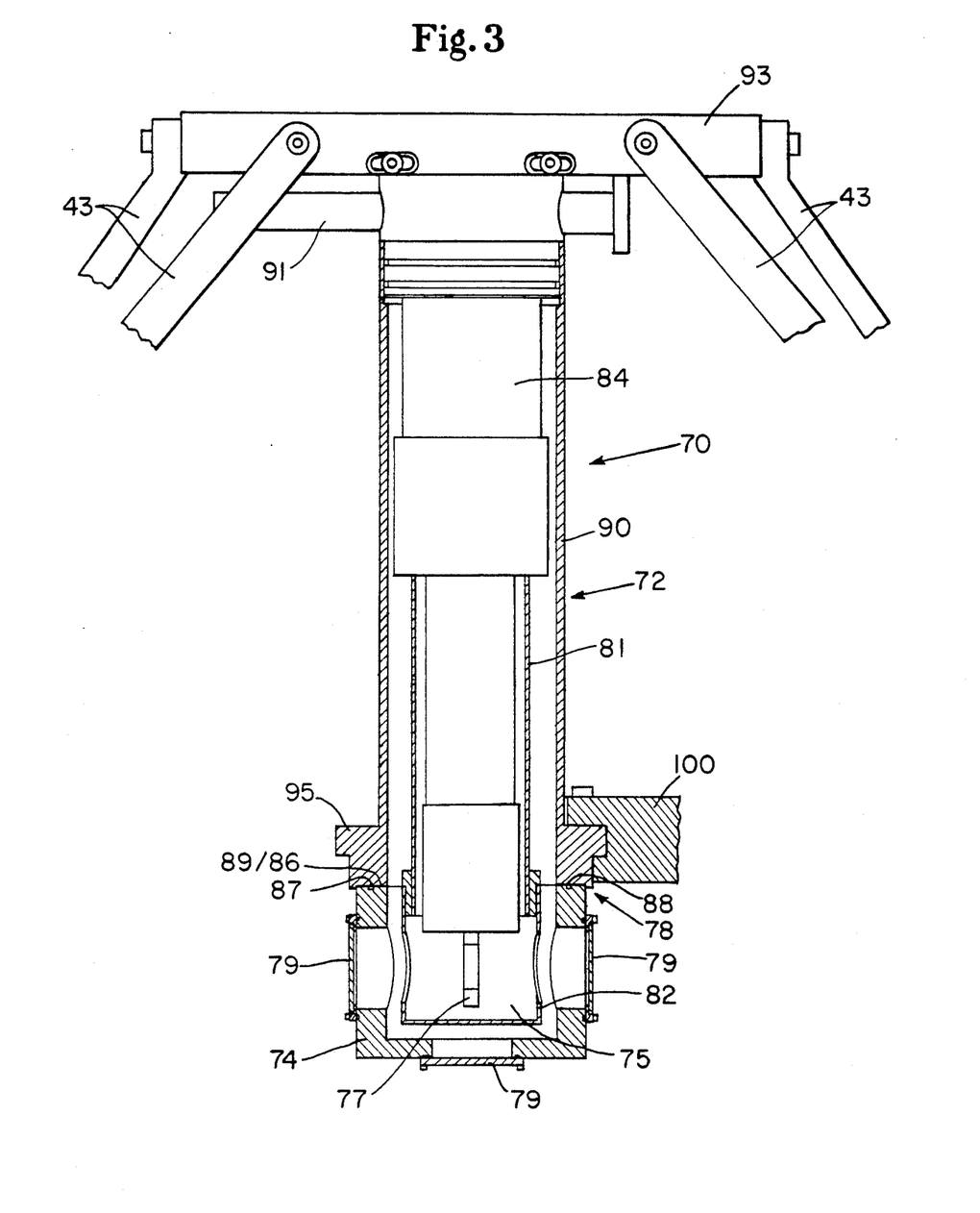
FIG. 3 is an enlarged, partial vertical cross-sectional view of the shroud attached to the mounting system of FIG. 1.

As best illustrated in FIG. 3, shroud 70 will preferably comprise an upper portion 72, and a lower portion 74 which defines at least a portion of cold test chamber 75. A sample holder 77 is shown as depending from the lower portions of the closed-cycle helium refrigerator 84, as described above. While the closed-cycle helium refrigerator can be obtained from various sources in the industry, one acceptable device includes the model DMX-20 refrigerator available from APD Cryogenics, Inc. To maintain cooling efficiency, the refrigerator mechanism will include a radiation shield, as shown at 81 and 82 in FIG. 3. Lower portion 74 of shroud 70 is further illustrated as comprising a plurality of peripherally spaced ports or windows 79, wherein experimental access to samples held within sample holder 77 can be provided along a plurality of mutually perpendicular axes.

Refrigerator mechanisms have often been supplied with integral or one-piece vacuum shrouds and thermal shields which require removal of the entire shroud and/or substantial disassembly of the refrigeration unit to obtain substantial access to the sample holder, and, traditionally, gaining access to the sample holder for experiment set up has been a cumbersome and time consuming procedure. Moreover, rigid coupling between the shroud and the spectrometer is usually required to minimize vibration damping and to optimize experimental results and reliability. Consequently, in the past, removal of the shroud would also entail decoupling and recoupling of the shroud to the spectrometer. To avoid such tedious and frustrating procedures, it was not uncommon for researchers to remove windows and/or covers of the ports of a shroud and attempt to achieve access to the sample holder through such open port. In addition to requiring work in substantially confined spaces in order to change samples and set up experiments, these procedures also risked compromising the vacuum-tight integrity of the seals in the lower portions of the shroud.

As best seen in FIG. 3, in a preferred arrangement of the present invention, shroud 70 comprises a removable lower shroud portion 74 which is connected to the upper portion 72 via a quick release coupling 78. In this way, a user can quickly remove the lower portion 74 of shroud 70 and radiation/heat shield 82 to gain access to the sample holder without affecting the remaining vacuum seal and mechanical couplings of the system. It is further contemplated that in relatively high vacuum applications, a flange-less quick release coupling 78, as illustrated in FIG. 3, can be utilized without a need for bolts or other mechanical attachment devices. For UHV systems, however, a bolt-on type (e.g.,CF) flange could be utilized to insure a proper vacuum seal and reliable integration of the upper and lower portions of shroud 70. Alternatively, however, quick release clamps or similar locking systems could also be utilized to avoid the need for bolt-type arrangements.

The flange-less or vacuum-held quick release coupling 78 of FIG. 3 is provided in the form of a vacuum interface 86 adjacent the lower surface of upper portion 72 of shroud 70, for sealing interaction with the upper surface 89 of lower portion 74. A seal groove 87 and associated ring seal 88 are provided between interface 86 and upper surface 89 to insure a vacuum-tight seal. Vacuum pressure is provided via vacuum port 91 and vacuum tube 90 in a conventional manner.

As will be understood, the quick release, two-piece arrangement of shroud 70 enables convenient substitution of a plurality of shroud lower portions 74 as desired. In this way, convenient access to sample holder 77 without affecting the alignment of the experimental set-up or the critical mechanical and vacuum connections, enables different types of experimental arrangements to be conveniently accommodated by substituting a lower shroud portion 74 appropriate for such experiments. For example, a lower portion 74 might be provided with beryllium windows for use in Mossbauer spectroscopy, or sapphire windows for optical measurements, and these ports can be provided in premanufactured, modular arrangements for simple interchange by the user.

Similarly, recessed windows or ports 79 might be provided in a customized lower portion 74 to shorten the distance between that window and the sample held within cold test chamber 75, or, as will be mentioned below, lower portion 74 may include means for interacting with an extended vacuum housing (e.g., 220 shown in FIG. 5) to accommodate a transducer connected to a cooled source or the like. A number of modular shroud portions 74 could be maintained at a testing location for selective use as needed.

Figure 4:
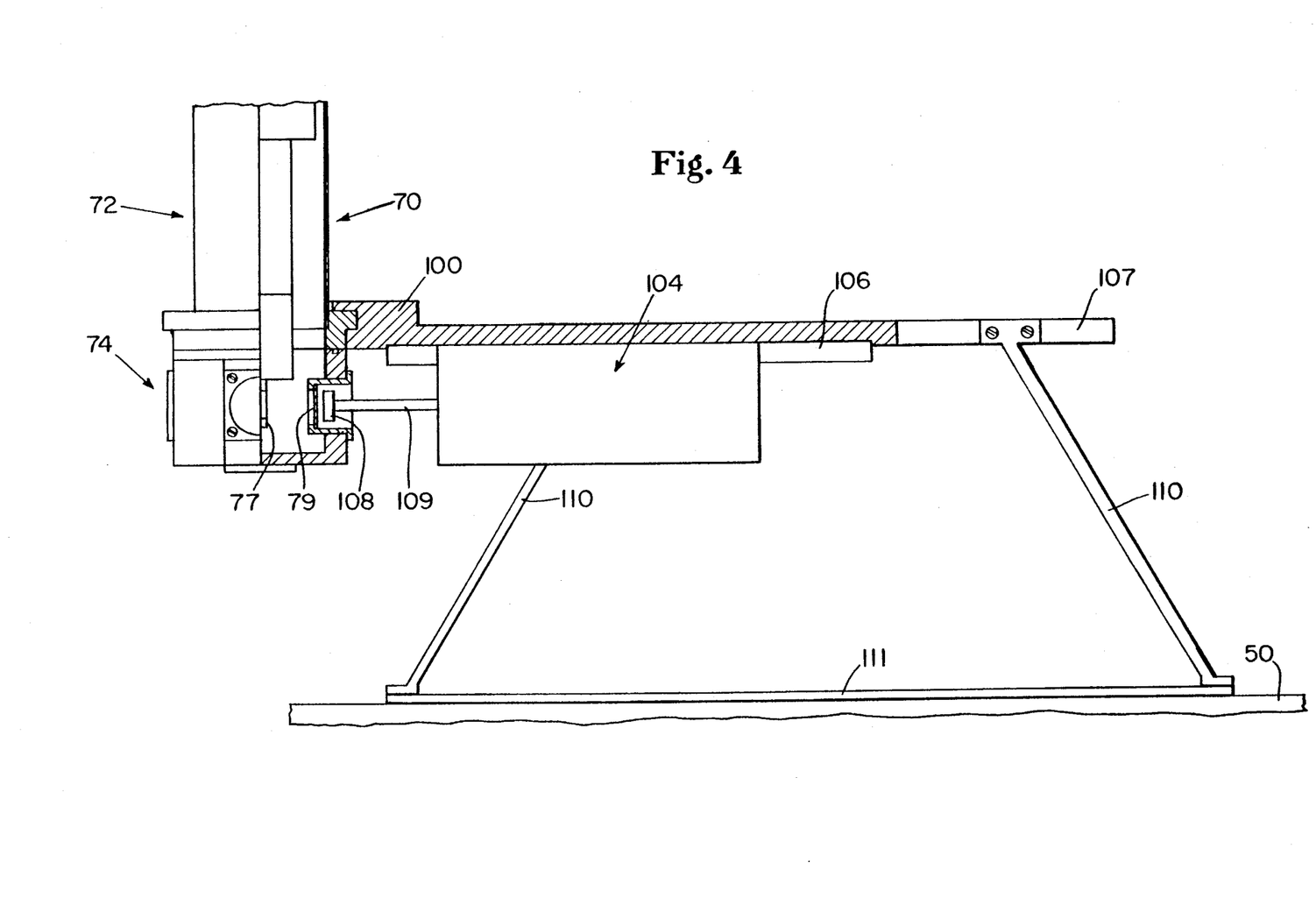
FIG. 4 is a partially broken out schematic illustration of a preferred shroud and spectrometer mounting arrangement made in accordance with the present invention.

As best seen in FIGS. 3 and 4, an outwardly extending connector flange 95 is also preferably provided adjacent the lower end of upper portion 72 of shroud 70. Particularly, flange 95 is illustrated as extending outwardly from at least a portion of shroud 70, and provides a portion of the means for rigidly mounting a spectrometer or other testing device to the shroud adjacent test chamber 75. For example, to couple a Mossbauer drive (i.e., the radioactive gamma ray source), it is preferred to rigidly mount a track arrangement (i.e., mounting track 106) outside of the vacuum shroud 70 for adjustable attachment of the Mossbauer drive unit (e.g., 104). Connector flange 95 provides for rigid attachment of a spectrometer mounting plate 100, which extends outwardly away from shroud 70 for supporting mounting track 106.

The illustration of FIG. 4 shows an exemplary preferred arrangement for Mossbauer spectrometry, wherein drive member 104 remains outside of the cooled portion of the vacuum shroud 70, but is rigidly attached thereto for alignment with cold test chamber 75. In the embodiment shown in FIG. 4, lower shroud portion 74 is provided with a recessed port 79 to accommodate the Mossbauer source 108 connected to drive 104 via drive shaft 109. A pair of support legs 110 are shown for stabilizing mounting plate 100, and are preferably attached to a slide plate 111 which is not rigidly connected to top plate 50 of vibration damping table 45. Particularly, because support track 106 must insure that extraneous lateral and rotational forces are not applied to shroud 70, support legs 110 preferably ride on movable slide plate 111 to obviate twisting or torquing forces which might result from rigid attachment.

Track 106 provides substantially linear adjustable movement of spectrometer 104 to enable accurate and reproducible location of the spectrometer source, and to enable adjustment of alignment and spacing such as between Mossbauer source 108 and sample holder 77. Track 106 can also be provided in the form of a relatively massive structure to help dampen any recoil from effective relative movement of the Mossbauer drive. In a Mossbauer set-up utilizing an electromechanical transducer (such as an Austin Science Associates K-3 or K-4 Linear Motor), a track 106 having a weight of approximately 40 pounds was successfully utilized to help dampen recoil. A mounting plate 107 is shown for use with an optional laser interferometer which may be desired for particular experimental procedures. While mounting plate 100 can be removed from shroud 70 for disassembly of the entire system and/or replacement of shroud 70 and refrigeration mechanism 15, it will generally remain rigidly affixed to shroud 70 via flange 95.

Figure 5:
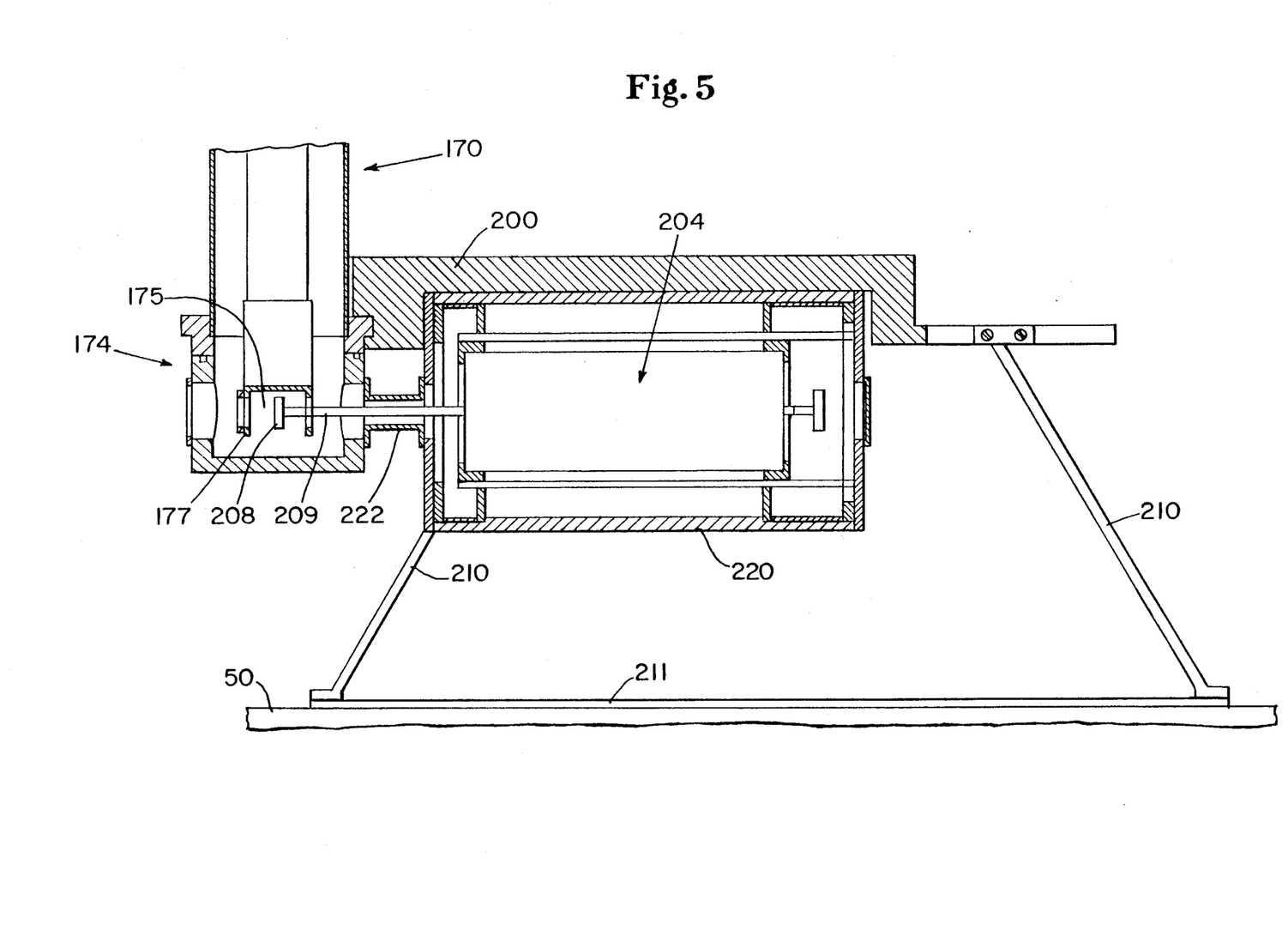
FIG. 5 is a partial cross-sectional schematic illustration of an alternate shroud and spectrometer mounting arrangement, wherein a Mossbauer source is also contained within the cooled test chamber.

Turning now to FIG. 5, there is illustrated a portion of an alternate embodiment of the present invention, wherein it is desired to cool the radioactive gamma ray source 208 and the absorber (sample) to the same temperature within cold test chamber 175. As will be appreciated, sample holder 177 has been slightly modified (i.e., a double holder) to accommodate the location of Mossbauer source 208 within cold chamber 175, and lower shroud portion 174 is modified to accommodate connector tube 222 which provides for connection of vacuum housing 220 with the balance of shroud 170 to insure proper fluid communication for vacuum. As is known, in traditional Dewar systems, experimental configurations can require that the radioactive gamma ray source and absorber be cooled to the same temperature. In any case, the isolation of vibrations from the cold test chamber must be maintained. The arrangement of FIG. 5 further illustrates source 208 extended into cold test chamber 175 on drive shaft 209. Both mounting plate 200 and the supported vacuum housing 220 are also preferably stabilized by support legs 210 and the interconnected slide plate 211.

Figure 6:
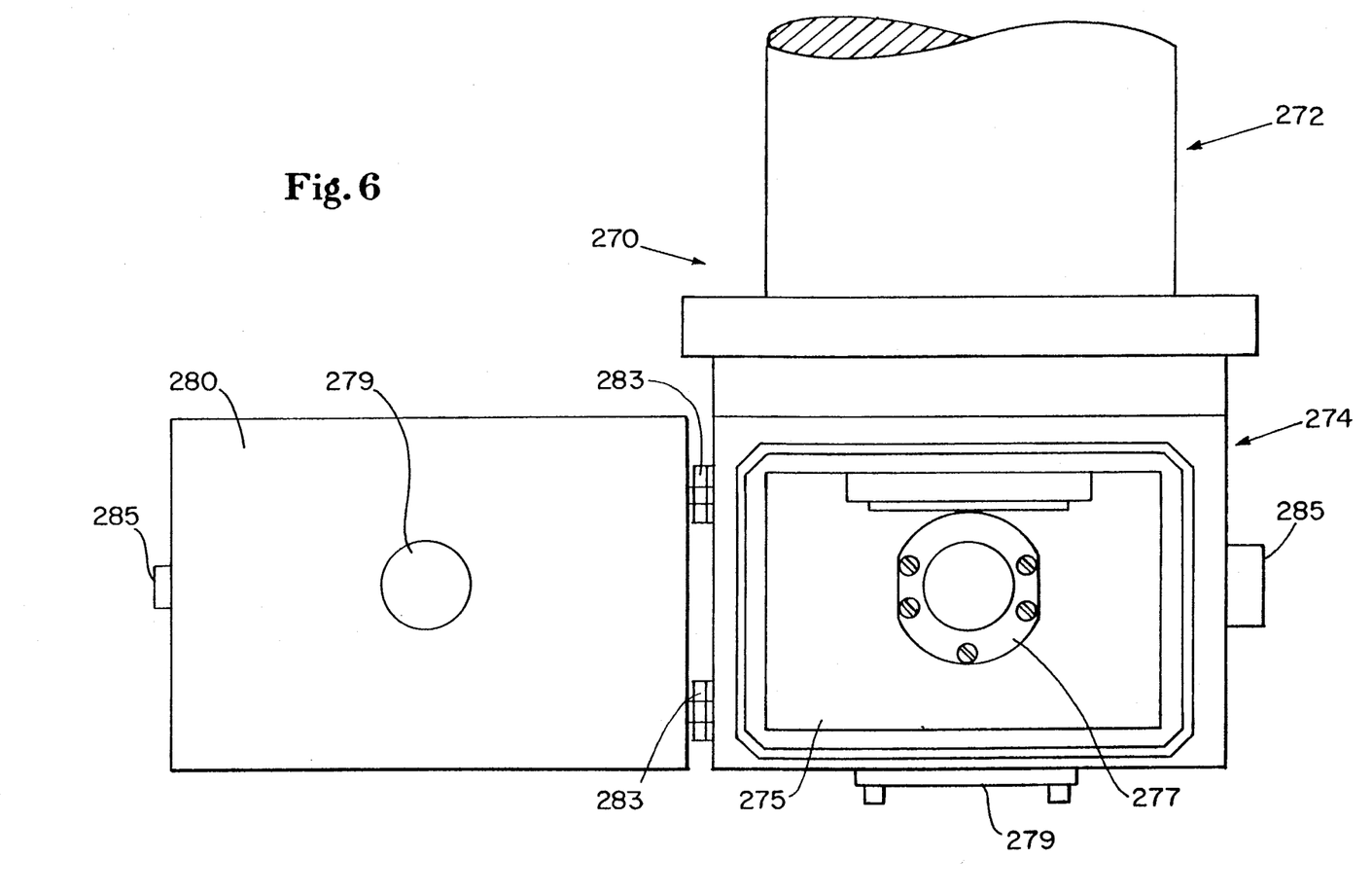
FIG. 6 is a partial elevational view of an alternate embodiment of the lower portions of a shroud made in accordance herewith, illustrating a hinged door-like access structure.

FIG. 6 illustrates an alternate embodiment of a shroud 270 made in accordance with the present invention, wherein lower shroud portion 274 comprises alternate means for providing relatively unencumbered access to cold test chamber 275 and sample holder 277. Particularly, in some applications, it may be preferred to provide selective unencumbered access to the interior of lower shroud portion 274 via an access door 280 having an open position (as illustrated). Particularly, it is contemplated that access door 280 might be provided in the form of a removable shroud piece, or, alteratively, as a hinged door-like structure as shown in FIG. 6. Access door 280 might be attached via one or more hinges 283 for movement between an open position (shown in FIG. 6) and a closed position sealing lower shroud portion 274 in a vacuum-type manner. A latch 285 or other means for appropriately maintaining access door 280 in closed, sealed position would be provided.

Implementation of the present invention has shown dramatic improvements in the elimination of vibration-induced errors and irregularities in low temperature spectroscopy experiments. For example, vibration causes randomly distributed velocity variations in Mossbauer spectra, thereby effectively increasing the uncertainty in the gamma ray energy measurements and an increase in the observed line width of the spectral lines. In extreme cases of vibration interference, resonances cannot be observed at all. In tests to determine effectiveness of the vibration isolation of the present system, a spectrum is first obtained at room temperature while the refrigerator mechanism is turned off in order to obtain a control for the spectral band width. The refrigerator is then turned on and the low temperature stabilized before a test spectrum is obtained with the refrigerator in operation. The resulting spectral line width is then compared with the control data, and any increase in line width will be due to resulting vibrations introduced by the refrigerator (discounting any thermally-induced line broadening effects).

In an experiment utilizing a source of $Co_{57}$, $^{57}Fe$ was provided in the form of an enriched foil absorber. In Mossbauer spectroscopy testing, the $^{57}Fe$ nuclear resonance is usually selected because the inner lines are of narrow width (e.g., approximately 0.22 mm/s), which is commonly observed with state-of-the-art spectrometers. While the absolute value of the observed line width depends entirely upon the quality of the gamma ray source and the thickness of the absorber, the difference between the line widths obtained with the refrigerator off and refrigerator on is the only important quantity, and this difference will be small or non-existent if the vibration has been successfully isolated.

The results of testing mounting systems made in accordance with the present invention and utilized with the APD Cryogenics, Inc. Model DMX-20 showed an observed line width of 0.2418 ($\pm$0.0085) mm/s with a 0.001" thick alpha-Fe foil absorber. When the refrigerating device was in operation and the temperature stabilized at 101K, a line width of 0.2423 ($\pm$0.0085) mm/s was observed. In addition, the data showed that the centroid of the two inner spectral lines acquires a more negative isomer shift due to the thermally induced second order Doppler shift, indicating that the alpha-Fe foil was indeed cooled. Other tests of mounting systems made in accordance herewith have confirmed the effectiveness of the present mounting system to obtain essentially vibration-free operation of sample cooling and low temperature spectroscopy operations.

It is contemplated that the mounting system of the present invention can be equally utilized to improve the operation and results of any laboratory instrument that would benefit from the addition of a vibration-free cryogenic accessory utilizing a closed-cycle refrigerator. Applications could include rare gas matrix isolation, ultraviolet, visible and infra-red spectroscopies, Raman scattering, photoluminescence, various optical and nuclear spectroscopies, Auger electron and secondary ion mass spectroscopies, electrical transport measurements, thermal transport measurements, microwave and millimeter wave measurements, scanning, tunneling and scanning electron microscopies, x-ray diffraction and other spectroscopies, and Rutherford back-scattering and channeling.

Having shown and described the preferred embodiments of the present invention, further adaptions of the vibration-free shroud and mounting system of the present invention can be accomplished by appropriate modifications by one of ordinary skill in the art without departing from the scope of the present invention. Several of such potential modifications have been mentioned, and others will be apparent to those skilled in the art. For example, it is contemplated that the first and second rigid support structures of the present mounting system can include means for providing vertical adjustment therebetween in order to accommodate different insulations and varying combinations of refrigeration mechanisms and laboratory instruments. Such vertical adjustment could be provided in the form of interchangeable struts and supports of varying sizes, adjustable strut members, or by any other means which would maintain the rigidity of the support structures and allow relative vertical adjustment.

Accordingly, the scope of the present invention should be considered in terms of the following claims and is understood not to be limited to the details of structure and operation shown and described in the specification and drawings.

We claim:

1. An improved substantially vibration-free mounting system for sample cooling and low temperature precision spectroscopy, wherein a refrigerator mechanism must be mounted adjacent to a cold test chamber, said system comprising:

a first rigid support structure for receiving and supporting the refrigerator mechanism;

a second rigid support structure independently receiving and supporting a shroud having a cold test chamber designed to house test samples on a sample holder therewithin at extremely low temperatures induced by said refrigerator mechanism, said second support structure being physically isolated from said first structure to prevent the transfer of vibrations therebetween, said first and second structures being aligned with one another along a vertical axis;

a gas envelope vibration isolating connection between said refrigerator mechanism and said shroud for providing for thermal communication therebetween;

means connected to said second support structure for preventing transmission of ambient vibrations to said test chamber, said preventing means comprising a plate-like member and vibration damping media at least partially supporting said member; and a means for rigidly mounting a spectrometer device to said shroud adjacent said test chamber.

2. The mounting system of claim 1, wherein said shroud comprises an upper portion and a removable lower portion which defines at least a portion of said test chamber.

3. The mounting system of claim 2, wherein said upper and lower portions of said shroud are connected in use by a quick release coupling.

4. The mounting system of claim 3, wherein said quick release coupling comprises a passive vacuum seal.

5. The improved mounting system of claim 2, wherein said plate-like member comprises an access opening to facilitate removal and replacement of said lower portion of said shroud.

6. The mounting system of claim 2, further comprising a plurality of interchangeable lower portions which can be quickly substituted onto said shroud to modify the testing capabilities of the system without requiring replacement of said upper portion.

7. The mounting system of claim 1, wherein said means for preventing transmission of vibrations to said test chamber comprises a plate-like table top supported by a volume of relatively loosely packed and dry granular material.

8. The improved mounting system of claim 7, wherein said granular material comprises sand.

9. The improved mounting system of claim 1, wherein said means for preventing transmission of vibrations comprises a table having a hollow portion within which said vibration damping media is placed for supporting said plate-like member.

10. The improved mounting system of claim 9, wherein said plate-like member is attached to at least one anchor mass buried within said vibration damping media therebelow.

11. The improved mounting system of claim 1, wherein said shroud comprises means for selectively providing substantially unencumbered access to said sample holder.

12. The mounting system of claim 11, wherein said means for providing substantially unencumbered access to said sample holder comprises a door-like structure on said shroud adjacent said cold test chamber, said door-like structure having an open position for selectively providing access to said sample holder.

13. The mounting system of claim 11, wherein said shroud comprises an upper portion and a removable lower portion, and wherein selective removal of said removable lower portion provides said substantially unencumbered access to said sample holder.

14. The improved mounting system of claim 1, wherein said means for rigidly mounting a spectrometer device comprises an attachment flange on said shroud.

15. An improved vibration-free mounting system for continuous sample cooling and low temperature Mossbauer spectrometry studies, wherein a refrigerator mechanism is mounted adjacent to a cold test chamber housing a sample to be studied, said system comprising:

a first rigid support structure for receiving and supporting the refrigerator mechanism;

a second rigid support structure for receiving and supporting a shroud having a cold test chamber designed to house test samples on a sample holder therewithin at low temperatures induced by said refrigerator mechanism, said second structure being physically independent of said first structure and maintaining said shroud in predetermined alignment with said first structure and said refrigerator mechanism;

means for rigidly mounting a Mossbauer spectrometer to said shroud adjacent said cold test chamber;

a gas envelope vibration isolating connection between said refrigerator mechanism and said shroud for providing thermal communication therebetween; and means upon which said second structure is supported for preventing transmission of ambient vibrational energy to said test chamber.

16. The mounting system of claim 15, wherein said cold test chamber comprises means for enabling relatively unencumbered selective access to said sample holder to facilitate mounting and substitution of test samples within said holder.

17. The mounting system of claim 16, wherein said enabling means comprises a removable lower shroud portion connected in use by a quick release arrangement to an upper portion of said shroud supported by said second structure.

18. The mounting system of claim 17, wherein said means for rigidly mounting the spectrometer is connected to said upper portion of said shroud.

19. The mounting system of claim 17, further comprising a plurality of lower shroud portions which can be individually selectively interchangeably connected to said upper portion of said shroud.

20. The mounting system of claim 15, wherein said means for mounting the spectrometer comprises a substantial mass to absorb and dampen recoil energy of said spectrometer in use.

21. The mounting system of claim 20, wherein said means for mounting the spectrometer comprises a mounting plate rigidly attached to the upper portion of said shroud adjacent said test chamber.

22. The mounting system of claim 15, wherein said first and second rigid support structures are vertically adjustable relative to one another.

* * * * *